(12) United States Patent
Schmidt et al.

(10) Patent No.: US 10,883,549 B2
(45) Date of Patent: Jan. 5, 2021

(54) CLUTCH PLATE AND FRICTION CLUTCH

(71) Applicant: ZF Friedrichshafen AG, Friedrichshafen (DE)

(72) Inventors: Stefan Schmidt, Friedrichshafen (DE); Derk Langenkaemper, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 54 days.

(21) Appl. No.: 16/219,021

(22) Filed: Dec. 13, 2018

(65) Prior Publication Data
US 2019/0186552 A1 Jun. 20, 2019

(30) Foreign Application Priority Data

Dec. 15, 2017 (DE) .................. 10 2017 222 944

(51) Int. Cl.
*F16D 13/64* (2006.01)
*F16D 25/0635* (2006.01)
*F16D 13/38* (2006.01)

(52) U.S. Cl.
CPC .......... *F16D 13/64* (2013.01); *F16D 13/38* (2013.01); *F16D 13/648* (2013.01);
(Continued)

(58) Field of Classification Search
CPC ........ F16D 13/38; F16D 13/64; F16D 13/648; F16D 25/0635; F16D 2250/00; F16D 2300/12
See application file for complete search history.

(56) References Cited

U.S. PATENT DOCUMENTS 5,439,087 A * 8/1995 Umezawa .............. F16D 13/52
192/107 R
7,258,218 B2 * 8/2007 Kinpara ................. F16D 13/52
192/70.2
(Continued)

FOREIGN PATENT DOCUMENTS

DE 102008005227 A1 7/2009
DE 102009017760 A1 11/2009
(Continued)

OTHER PUBLICATIONS

Definition of "Axis of Symmetry" retrieved from www.dictionary.com (Year: 2020).*
(Continued)

*Primary Examiner* — Stacey A Fluhart
(74) *Attorney, Agent, or Firm* — Dority & Manning, P.A.

(57) ABSTRACT

A plurality of annular clutch disks (12) is manufactured by blanking or die-cutting a flat sheet metal strip (2) during which the flat sheet metal strip (2) is advanced relative to a blanking or cutting tool along a feed direction between individual blanking or cutting processes with the blanking or cutting tool in order to form the annular clutch disks (12) from the flat sheet metal strip (2). Each of the annular clutch disks (12) is asymmetric with respect to a center point of a respective ring and includes an axis of symmetry (18) which is not orthogonal to the feed direction of the flat sheet metal strip. Each of the annular clutch disks (12) is axially symmetric at least to such an extent that each of the annular clutch disks (12) is installable in a multi-disk clutch (26) in precisely one first installation position (A) and in one second installation position (B). The second installation position results from the first installation position via turning over about the axis of symmetry (18).

4 Claims, 3 Drawing Sheets

(52) U.S. Cl.
CPC ...... *F16D 25/0635* (2013.01); *F16D 2250/00* (2013.01); *F16D 2300/12* (2013.01)

(56) References Cited

U.S. PATENT DOCUMENTS

| | | | |
|---|---|---|---|
| 7,798,301 B2* | 9/2010 | Keating | F16D 13/648 |
| | | | 192/107 R |
| 9,856,922 B2* | 1/2018 | Reisch | F16D 13/648 |
| 9,982,730 B2* | 5/2018 | Robson | F16D 65/0037 |
| 2009/0183965 A1 | 7/2009 | Reisser et al. | |

FOREIGN PATENT DOCUMENTS

| | | | | |
|---|---|---|---|---|
| DE | 102009048620 A1 | | 4/2011 | |
| DE | 102013223770 A1 | * | 7/2014 | ............ F16D 13/52 |
| DE | 102013223770 A1 | | 7/2014 | |
| DE | 102013226604 A1 | | 6/2015 | |
| EP | 2063146 A1 | | 5/2009 | |
| WO | WO 2009/049724 A1 | | 4/2009 | |

OTHER PUBLICATIONS

German Search Report DE102017222944.6 dated Aug. 7, 2018. (12 pages).

* cited by examiner

CLUTCH PLATE AND FRICTION CLUTCH

FIELD OF THE INVENTION

Multi-disk clutchs or brakes are utilized in vehicle transmissions as frictional shift elements for torque transmission. The disks are annular disks which, in the case of outer clutch disks, include a driving toothing on the outside and, in the case of inner clutch disks, include a driving toothing on the inside. In a clutch or brake, outer clutch disks and inner clutch disks are alternatingly stacked one on top of another. By way of the respective driving toothings, the disks engage into associated driving toothings of the two clutch halves, in which the disks are axially movable. In the unactuated condition, practically no torque is transmitted between the inner clutch disks and the inner clutch disks—the clutch or brake is disengaged in this case. In order to actuate the clutch or the brake, the disk stack is usually hydraulically compressed with the aid of an axial force, and so a torque is transmitted, the level of which depends on the axial force.

In order to achieve a uniform application of pressure onto the disks and a uniform torque transmission during slip operation, one possibility would be to produce the individual disks with very high precision in terms of their thickness, which would generate high costs, however. The disks are usually blanked from a rolled sheet metal strip which is unrolled from a so-called sheet metal coil. With respect to the sheet metal coils utilized for this purpose, a sheet metal thickness which remains constant across the width of the sheet metal strip is not ensured, which results in the situation in which disks which have been blanked from the sheet metal strip typically have a maximum thickness in a certain sector and have a minimum thickness in another, usually diametrically opposed, sector. Therefore, in known manufacturing processes for clutches, the thickness or thickness distribution around the perimeter of the disks is measured before installation. The disks are then mounted in the clutch with a suitable angular alignment turned relative to one another. The disadvantage thereof is the time and costs required for performing the measurements.

DE 10 2013 223 770 A1 describes a method for manufacturing a disk pack for motor vehicle clutches, in which disks are provided, during blanking, with a marking of their angular position relative to the sheet metal strip. The disks are then installed into a clutch pack with a different orientation of the marking, and so fluctuations in the sheet metal thickness of the sheet metal strip, which result in the disks systematically having a maximum thickness in a certain angular sector and a minimum thickness in another angular sector, are compensated in the clutch pack. In this method, the need to perform the measurements is dispensed with, although one precondition for carrying out this method is that the disks be installable in different angular positions. This means, in turn, that the disk design also allows for installation errors.

SUMMARY OF THE INVENTION

Example aspects of the present invention provide alternative clutch disks and a multi-disk clutch adapted thereto.

The clutch disk according to example aspects of the invention is manufactured by blanking or die-cutting from a sheet metal strip which is advanced between the individual blanking or cutting processes relative to a blanking or cutting tool. The clutch disk is not point-symmetrical with respect to the center point of the ring, i.e., it is asymmetrically designed, whereby it is ensured that the clutch disk cannot be installed in an arbitrary angular position in an adapted disk carrier of a multi-disk clutch. Simultaneously, the clutch disk has an axis of symmetry which is not aligned orthogonally to the feed direction of the sheet metal strip, however, and with respect to which the clutch disk is designed to be axially symmetric at least to such an extent that the clutch disk can be installed in precisely one first installation position and one second installation position, wherein the second installation position results from the first installation position via turning over about the axis of symmetry.

If the sheet metal strip now has an uneven thickness distribution transversely to the feed direction, which remains constant in the feed direction, however, this has the result that the clutch disks each have a maximum thickness on one side of the axis of symmetry and a minimum thickness on the other side of the axis of symmetry. If the clutch disks are now stacked one on top of another in the first and the second installation positions in alternation, the thickness maxima of adjacent clutch disks do not lie on top of each other and, in sum, at least partially compensate each other.

In one advantageous embodiment of the invention, the axis of symmetry is aligned in the feed direction of the sheet metal strip, i.e., in parallel thereto. It is therefore ensured that the thickness maxima of the clutch disks stacked one on top of another in the first and the second installation positions in alternation are diametrically opposed and, therefore, a maximum thickness of one clutch disk is situated precisely over a minimum thickness of an adjacent clutch disk, whereby, in sum, the thickness differences completely compensate each other.

In an advantageous way, the clutch disk is provided with an alignment feature, on the basis of which the alignment with respect to the sheet metal strip can be established. The alignment feature can be in the form, for example, of a punched marking or a design of a driving toothing having a unique position. The alignment feature makes it possible to reconstruct the position in which the clutch disk was blanked from the sheet metal strip and to differentiate the first installation position from the second installation position.

In one embodiment of the invention, the clutch disk includes a driving toothing which is asymmetrically designed with respect to the center point of the ring and includes at least one non-toothed sector. Simultaneously, the clutch disk has an axis of symmetry which is not aligned orthogonally to the feed direction, and with respect to which the driving toothing is designed to be axially symmetric at least to such an extent that the driving toothing can be installed in a multi-disk clutch in precisely one first installation position and one second installation position, wherein the second installation position results from the first installation position via turning over about the axis of symmetry. In this case, the alignment feature is in the form of at least one reference tooth of the driving toothing, which is present on only one side of the axis of symmetry.

One advantageous refinement of the clutch disk is characterized in that the tooth pitch angle increment of the driving toothing is 10°, wherein the 0° position is located on the axis of symmetry and the driving toothing includes a driving tooth only at the angular positions 0°, 10°, 20°, 30°, 50°, 70°, 90°, 110°, 160°, 170°, 180°, 190°, 200°, 250°, 270°, 290°, 300°, 310°, 330°, 340° and 350°. In this case, the driving tooth at the angular position 300° forms the reference tooth. There is no tooth on the other side of the axis of symmetry at 60°.

The clutch disks according to example aspects of the invention can be advantageously utilized in a multi-disk clutch in such a way that the clutch disks are stacked one on top of another in the first and the second installation positions in alternation, and so, in the stack, sectors having increased thickness and sectors having decreased thickness of clutch disks adjacent to one another are aligned with respect to each other in such a way that thickness fluctuations which are present at least partially compensate each other during stacking. The clutch disks are assigned to one clutch half in this case and are designed as outer clutch disks or inner clutch disks. A lined disk which is assigned to the other clutch half is then situated between every two clutch disks.

One advantageous embodiment of the multi-disk clutch includes a disk carrier which is provided with a driving toothing which matches the driving toothing of the clutch disks, includes at least one non-toothed sector, and includes a tooth gap matched to the reference tooth in the first as well as the second installation positions. As a result, the installability is limited to the two predefined installation positions.

The non-toothed sector is utilized in this case, on the one hand, to ensure that the clutch disk can be installed only in the two installation positions. In addition, a non-toothed sector offers space in the disk carrier for hydraulic ducts.

Clean Replacement Specification

In one geometrically advantageous embodiment of the multi-disk clutch, the tooth pitch angle increment of the driving toothing of the disk carrier is 10°, wherein the 0° position is located on the axis of symmetry and the driving toothing includes a tooth gap for accommodating a driving tooth of the clutch disks only at the angular positions 0°, 10°, 20°, 30°, 40°, 50°, 60°, 70°, 80°, 90°, 100°, 110°, 160°, 170°, 180°, 190°, 200°, 210°, 250°, 270°, 290°, 300°, 310°, 330°, 340° and 350°.

BRIEF DESCRIPTION OF THE DRAWINGS

Advantageous embodiments of the invention are explained in greater detail with reference to the attached figures. Wherein.

DETAILED DESCRIPTION

Figure 1:
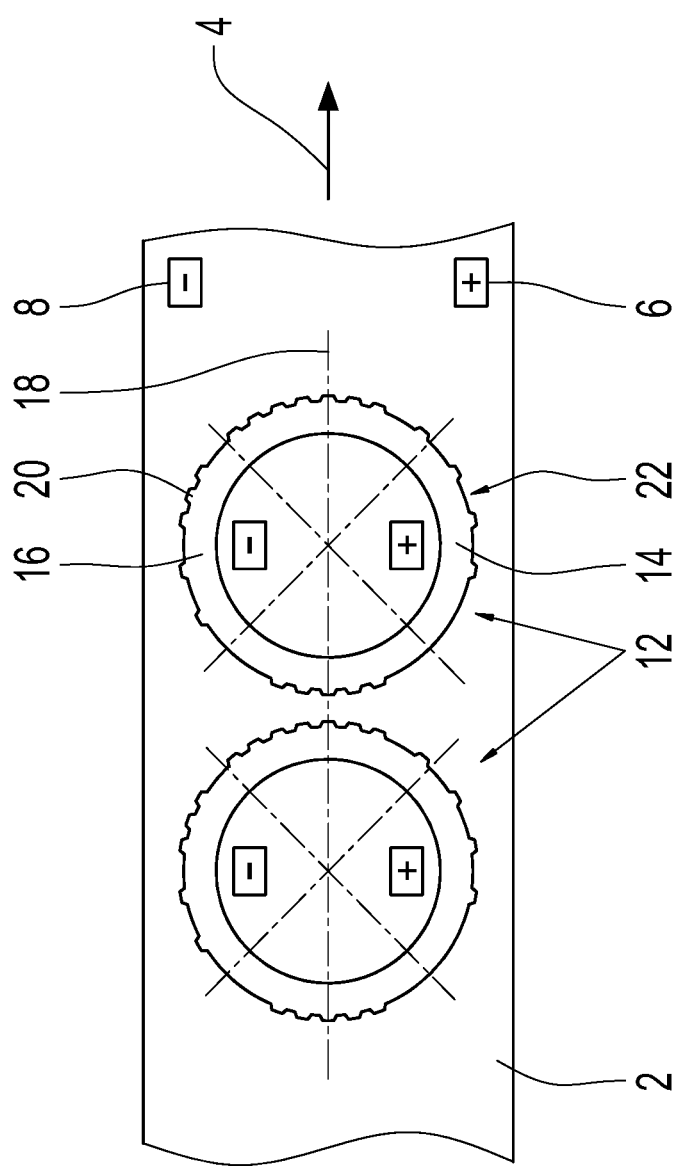
FIG. 1 shows clutch disks in a sheet metal strip before the blanking.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIG. 1, the reference numeral 2 marks a piece of sheet metal strip, which has been unrolled from a sheet metal coil and is aligned in the conveyance direction, which is indicated by the arrow 4, relative to the punch press. Due to the rolling process during the manufacture of the sheet metal strip, the sheet metal strip has one side with increased thickness 6 and one side with decreased thickness 8. The annular clutch disks 12 are blanked one after another from the sheet metal strip 2. Between the blanking processes, the sheet metal strip is advanced in the conveyance direction. As a result, the blanked clutch disk includes a sector having increased thickness 14 and a sector having decreased thickness 16. The clutch disks 12 include a driving toothing on their external contours.

With respect to the center point of the ring, the driving toothing and, therefore, the clutch disk, are asymmetrically designed, i.e., point-symmetry is not given. The clutch disks 12 have an axis of symmetry 18, however, which is aligned in the feed direction of the sheet metal strip in the embodiment shown in FIG. 1. The clutch disks are designed to be axially symmetric with respect to this axis of symmetry to such an extent that the clutch disks can be installed, in a multi-disk clutch, in precisely one first installation position and one second installation position, wherein the second installation position results from the first installation position via turning over about the axis of symmetry. A complete axial symmetry is not given, however: The mirror image of the reference tooth of the driving toothing marked with 20 is not present. At this point, which is marked with 22, the clutch disk includes a so-called missing tooth. The alignment of the blanked clutch disk with respect to the sheet metal strip can be established on the basis of the reference tooth 20, and, therefore, the side including the sector having increased thickness 14 can be differentiated from the other side including the sector having decreased thickness 16.

Figure 2:
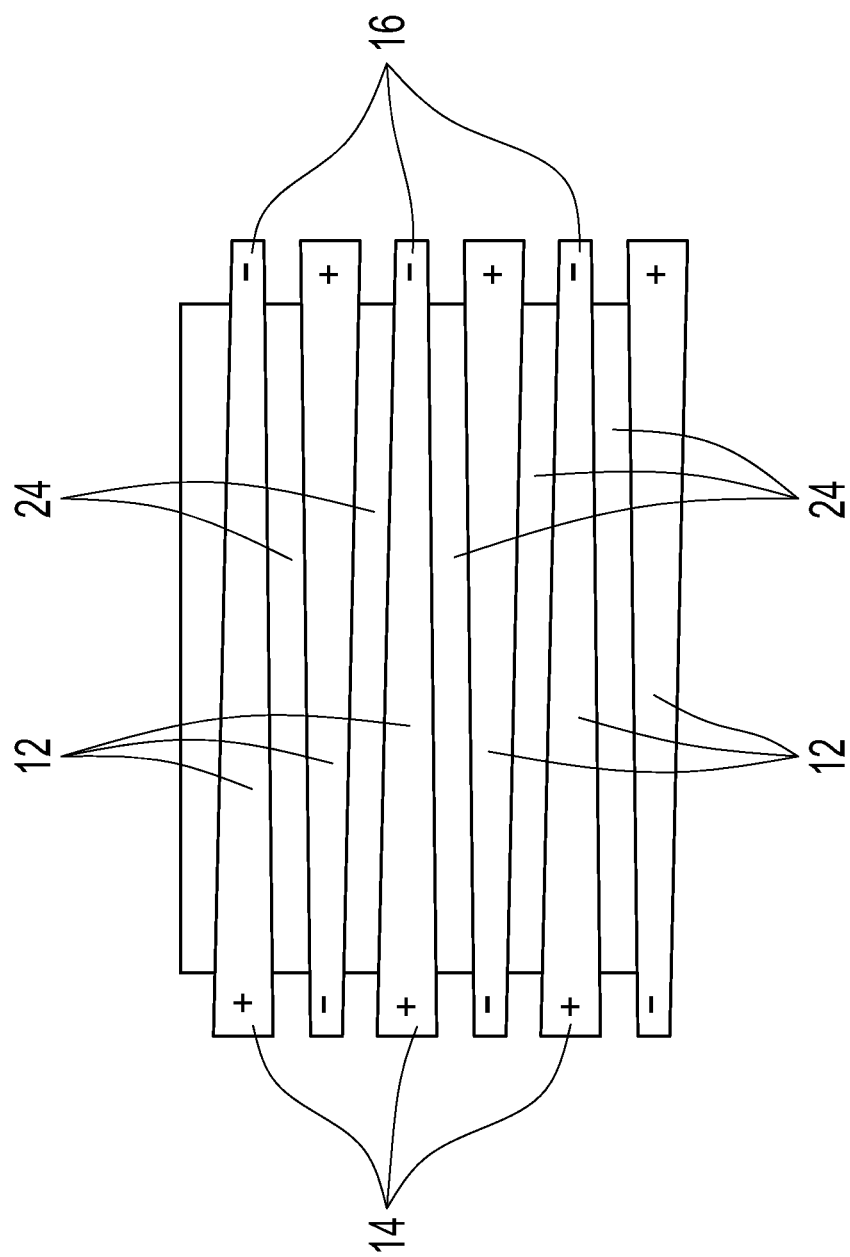
FIG. 2 shows a disk stack.

FIG. 2 shows a disk stack, in which the clutch disks 12 have been stacked one on top of another in the first installation position and in the second installation position in alternation, wherein a lined disk 24, which is assigned to a second clutch half, is situated in the stack between adjacent clutch disks 12 which are assigned to a first clutch half. In this case, one sector having decreased thickness 16 of a clutch disk 12 is located over a sector having increased thickness 14 of an adjacent clutch disk 12 in each case, and so the thickness fluctuations in the stack compensate each other.

Figure 3:
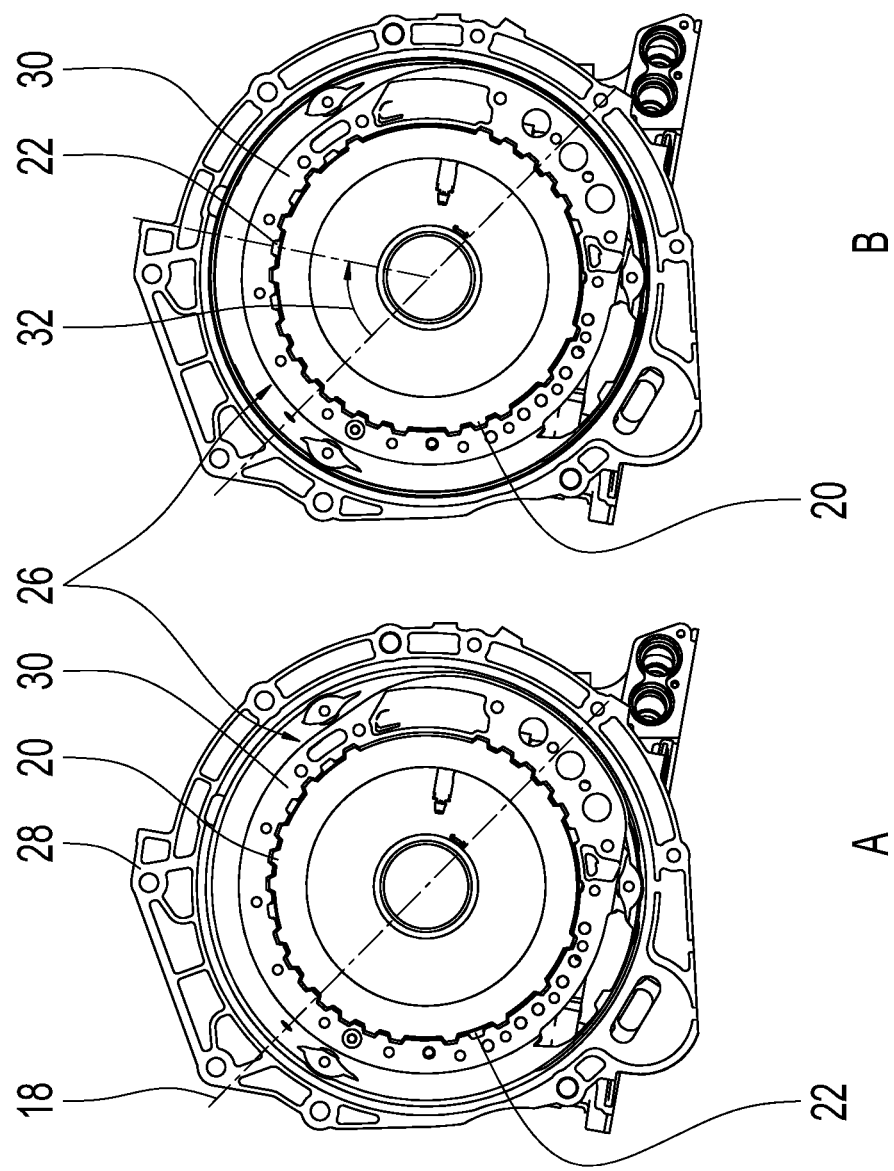
FIG. 3 shows a multi-disk clutch in a transmission housing.

FIG. 3 shows a multi-disk clutch 26 in a transmission housing 28 in two representations A and B. In FIG. 3, a disk carrier into which clutch disks 12 have been placed is marked with 30. In representation A, the uppermost clutch disk 12 has been installed in a first installation position, while, in representation B, the uppermost clutch disk 12 has been installed in the second installation position. In this case, the second installation position results from the first installation position by turning the clutch disk 12 over about the axis of symmetry 18. The two installation positions differ by the position of the reference tooth 20 and the opposed missing tooth 22 of the driving toothing.

In this case, the disk carrier 26 includes a tooth gap at the position of the reference tooth 20 as well as at the position of the missing tooth 22, which is opposed with respect to the axis of symmetry 18, whereby the installation in both installation positions is made possible. Due to the asymmetry of the driving toothing of the clutch disks 12 and the matching driving toothing of the disk carrier with respect to the center point of the ring, other installation positions are ruled out, however, which ensures failsafe installation.

In the case of the clutch disks 12 shown in FIG. 3, the tooth pitch angle increment of the driving toothing is 10°, wherein the 0° position is located on the axis of symmetry, on which the angle 32 is based. In representation B, the driving toothing includes a driving tooth only at the angular positions 0°, 10°, 20°, 30°, 50°, 70°, 90°, 110°, 160°, 170°, 180°, 190°, 200°, 250°, 270°, 290°, 300°, 310°, 330°, 340° and 350°. The missing tooth 22 is located at the position 60° and the reference tooth 20 is located at the position 300°. The driving toothing of the disk carrier 30 includes a tooth gap for accommodating a driving tooth of the clutch disks only at the angular positions 0°, 10°, 20°, 30°, 40°, 50°, 60°, 70°, 80°, 90°, 100°, 110°, 160°, 170°, 180°, 190°, 200°, 210°, 250°, 270°, 290°, 300°, 310°, 330°, 340° and 350°. In this case, a non-toothed sector is therefore given at the angular positions 60° and 300°, which includes a tooth gap which matches the reference tooth 20 in the first as well as the second installation positions.

Modifications and variations can be made to the embodiments illustrated or described herein without departing from the scope and spirit of the invention as set forth in the appended claims.

REFERENCE CHARACTERS 2 sheet metal strip
4 conveyance direction
6 side having increased thickness
8 side having decreased thickness
12 disk
14 sector having increased thickness
16 sector having decreased thickness
18 axis of symmetry
20 reference tooth
22 missing tooth
24 lined disk
26 multi-disk clutch
28 transmission housing
30 disk carrier
32 angle

The invention claimed is:

1. A plurality of annular clutch disks (12), wherein:
   the annular clutch disks (12) are manufactured by blanking or die-cutting a flat sheet metal strip (2) during which the flat sheet metal strip (2) is advanced relative to a blanking or cutting tool along a feed direction between individual blanking or cutting processes with the blanking or cutting tool in order to form the annular clutch disks (12) from the flat sheet metal strip (2);
   each of the annular clutch disks (12) is asymmetric with respect to a center point of a respective ring and includes an axis of symmetry (18) which is not orthogonal to the feed direction of the flat sheet metal strip;
   each of the annular clutch disks (12) is axially symmetric about the axis of symmetry (18) at least to such an extent that each of the annular clutch disks (12) is only installable in a multi-disk clutch (26) in either one first installation position (A) or in one second installation position (B), the second installation position resulting from the first installation position via turning over about the axis of symmetry (18);
   each of the annular clutch disks (12) comprises an alignment feature (20) indicative of alignment with respect to the sheet metal strip (2);
   each of the annular clutch disks (12) comprises a driving toothing which is asymmetrical with respect to the center point of the respective ring and at least one non-toothed sector;
   the driving toothing is axially symmetric to the axis of symmetry (18) at least to such an extent that the driving toothing is only installable in the multi-disk clutch (26) in either the first installation position (A) or the second installation position (B), the second installation position resulting from the first installation position via turning over about the axis of symmetry (18);
   the alignment feature is at least one reference tooth (20) of the driving toothing, the at least one reference tooth (20) positioned on only one side of the axis of symmetry (18);
   a tooth pitch angle increment of the driving toothing is 10°;
   a 0° position is located on the axis of symmetry; and
   the driving toothing consists of a respective driving tooth at each angular position of 0°, 10°, 20°, 30°, 50°, 70°, 90°, 110°, 160°, 170°, 180°, 190°, 200°, 250°, 270°, 290°, 300°, 310°, 330°, 340° and 350°.

2. A multi-disk clutch (26) or brake comprising a disk carrier (30) and a stack of the annular clutch disks (12) of claim 1, wherein:
   the annular clutch disks (12) are alternatingly stacked one on top of another in the first and the second installation positions such that, in the stack, sectors of the annular clutch disks (12) having increased thickness (14) adjacent to sectors of the annular clutch disks (12) having decreased thickness (16) are aligned in a manner that at least partially compensates for thickness fluctuations in the annular clutch disks (12) within the stack;
   the disk carrier (30) comprises a driving toothing which matches the driving toothing of the annular clutch disks (12), at least one non-toothed sector, and a tooth gap matched to the reference tooth (20) in the first and the second installation positions of the annular clutch disks (12);
   a tooth pitch angle increment of the driving toothing of the disk carrier is 10°; and
   the driving toothing of the disk carrier consists of a respective tooth gap for accommodating the driving tooth of the annular clutch disks (12) at each angular position of 0°, 10°, 20°, 30°, 40°, 50°, 60°, 70°, 80°, 90°, 100°, 110°, 160°, 170°, 180°, 190°, 200°, 210°, 250°, 270°, 290°, 300°, 310°, 330°, 340° and 350°.

3. A multi-disk clutch (26) or brake comprising a stack of annular clutch disks (12), wherein:
   the annular clutch disks (12) are manufactured by blanking or die-cutting a flat sheet metal strip (2) during which the flat sheet metal strip (2) is advanced relative to a blanking or cutting tool along a feed direction between individual blanking or cutting processes with the blanking or cutting tool in order to form the annular clutch disks (12) from the flat sheet metal strip (2);
   each of the annular clutch disks (12) is asymmetric with respect to a center point of a respective ring and includes an axis of symmetry (18) which is not orthogonal to the feed direction of the flat sheet metal strip;
   each of the annular clutch disks (12) is axially symmetric about the axis of symmetry (18) at least to such an extent that each of the annular clutch disks (12) is only installable in a multi-disk clutch (26) in either one first installation position (A) or in one second installation position (B), the second installation position resulting from the first installation position via turning over about the axis of symmetry (18); and
   the annular clutch disks (12) are alternatingly stacked one on top of another in the first and the second installation positions such that, in the stack, sectors of the annular clutch disks (12) having increased thickness (14) adjacent to sectors of the annular clutch disks (12) having decreased thickness (16) are aligned in a manner that at least partially compensates for thickness fluctuations in the annular clutch disks (12) within the stack.

4. A multi-disk clutch (26) or brake comprising a disk carrier (30) and a stack of annular clutch disks (12), wherein:

the annular clutch disks (12) are manufactured by blanking or die-cutting a flat sheet metal strip (2) during which the flat sheet metal strip (2) is advanced relative to a blanking or cutting tool along a feed direction between individual blanking or cutting processes with the blanking or cutting tool in order to form the annular clutch disks (12) from the flat sheet metal strip (2);

each of the annular clutch disks (12) is asymmetric with respect to a center point of a respective ring and includes an axis of symmetry (18) which is not orthogonal to the feed direction of the flat sheet metal strip;

each of the annular clutch disks (12) is axially symmetric about the axis of symmetry (18) at least to such an extent that each of the annular clutch disks (12) is only installable in a multi-disk clutch (26) in either one first installation position (A) or in one second installation position (B), the second installation position resulting from the first installation position via turning over about the axis of symmetry (18);

each of the annular clutch disks (12) comprises an alignment feature (20) indicative of alignment with respect to the sheet metal strip (2);

each of the annular clutch disks (12) comprises a driving toothing which is asymmetrical with respect to the center point of the respective ring and at least one non-toothed sector;

the driving toothing is axially symmetric to the axis of symmetry (18) at least to such an extent that the driving toothing is only installable in the multi-disk clutch (26) in either the first installation position (A) or the second installation position (B), the second installation position resulting from the first installation position via turning over about the axis of symmetry (18);

the alignment feature is at least one reference tooth (20) of the driving toothing, the at least one reference tooth (20) positioned on only one side of the axis of symmetry (18);

the annular clutch disks (12) are alternatingly stacked one on top of another in the first and the second installation positions such that, in the stack, sectors of the annular clutch disks (12) having increased thickness (14) adjacent to sectors of the annular clutch disks (12) having decreased thickness (16) are aligned in a manner that at least partially compensates for thickness fluctuations in the annular clutch disks (12) within the stack; and the disk carrier (30) comprises a driving toothing which matches the driving toothing of the annular clutch disks (12), at least one non-toothed sector, and a tooth gap matched to the reference tooth (20) in the first and the second installation positions of the annular clutch disks (12).

* * * * *